United States Patent

Lüottgert et al.

Patent Number: 5,185,838
Date of Patent: Feb. 9, 1993

[54] CONNECTOR PIN FOR AN OPTICAL WAVEGUIDE CONNECTOR

[75] Inventors: Karl-Ernst Lüottgert; Klaus Schulz, both of Berlin, Fed. Rep. of Germany

[73] Assignee: Siemens Aktiengesellschaft, Berlin & Munich, Fed. Rep. of Germany

[21] Appl. No.: 720,448

[22] PCT Filed: Oct. 5, 1989

[86] PCT No.: PCT/DE89/00642
§ 371 Date: Jun. 24, 1991
§ 102(e) Date: Jun. 24, 1991

[87] PCT Pub. No.: WO90/07136
PCT Pub. Date: Jun. 28, 1990

[30] Foreign Application Priority Data

Dec. 22, 1988 [DE] Fed. Rep. of Germany ....... 3843733

[51] Int. Cl.$^5$ ............................................. G02B 6/36
[52] U.S. Cl. .......................................... 385/84; 385/81
[58] Field of Search ................ 385/80, 84, 86, 66, 385/72, 87

[56] References Cited

U.S. PATENT DOCUMENTS

| | | | |
|---|---|---|---|
| 4,634,214 | 1/1987 | Cannon, Jr. | 350/96.2 |
| 4,687,288 | 8/1987 | Margolin et al. | 385/87 X |
| 4,842,363 | 6/1989 | Margolin et al. | 385/84 |
| 5,073,042 | 12/1991 | Mulholland et al. | 385/86 X |

FOREIGN PATENT DOCUMENTS

0223609  5/1987  European Pat. Off.
3541245  5/1987  Fed. Rep. of Germany.

Primary Examiner—John D. Lee
Assistant Examiner—Phan Thi Heartney
Attorney, Agent, or Firm—Kenyon & Kenyon

[57] ABSTRACT

An optical waveguide connector consists of a ceramic pin (11) with a bore (12) for the bare optical waveguide (7). In the superimposed abutment (14) for a compression spring (25), two bore sections (16, 17) are provided whose diameter corresponds to that of the optical waveguide with a coating (8) and with a jacket (9), relatively. The precise guidance of the optical waveguide so obtained in all sections minimizes the likelihood of sharp bends.

2 Claims, 1 Drawing Sheet

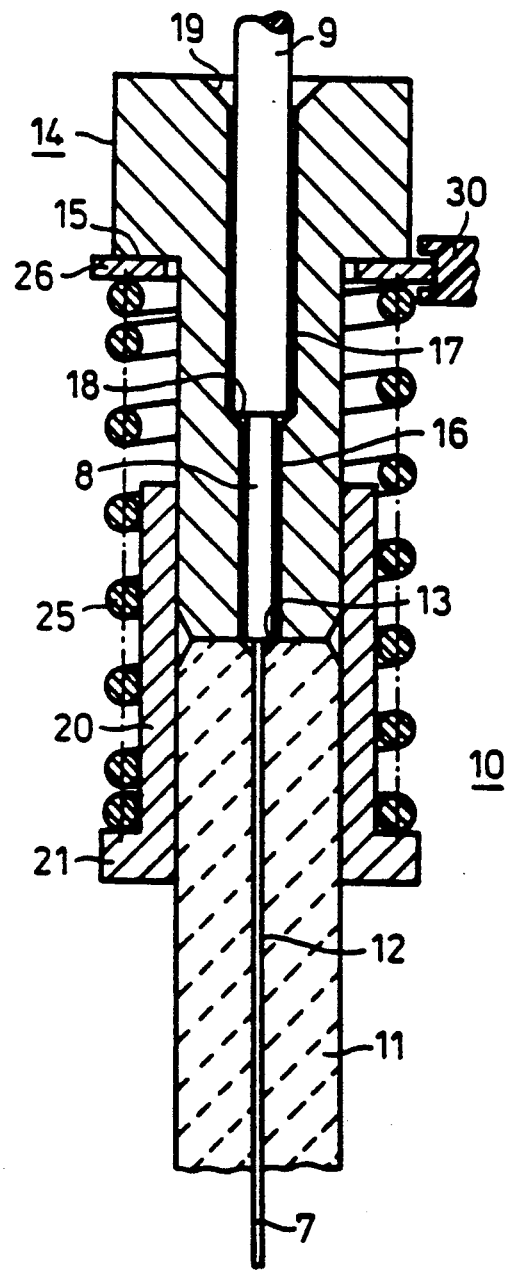

CONNECTOR PIN FOR AN OPTICAL WAVEGUIDE CONNECTOR

BACKGROUND OF THE INVENTION

The present invention relates generally to connector pins for optical waveguide connectors, which connector pins accommodate one end of an optical waveguide. More particularly, the present invention relates to such a connector pin which comprises at least one ceramic pin with a central bore accommodating the optical waveguide, a bushing with a flange pressed onto the ceramic pin, a compression spring supported on the flange at one end and having a thrust washer at the other end, and an abutment forced into the bushing and likewise provided with a central bore accommodating a cylindrical optical waveguide with the coating surrounding it and the jacket enveloping the optical waveguide and the coating.

Optical waveguide connectors are available on the market having pins that can move relative to the shell of the connector. This movement capability is necessary during insertion and withdrawal to limit the stresses to which the pins are subjected. This movement capability of the connector pins automatically results in movement of the optical waveguides, for which minimal permissible bending radiuses are specified. It is imperative that sharp bends in the optical waveguides be prevented when they are inserted in connector pins. The known connector pins come with only two bore diameters, the smaller-diameter bore in the ceramic pin itself accommodating the bare optical waveguide, and the larger-diameter bore in the abutment being adapted to the diameter of the jacket of the optical waveguide. Over a portion of the length of optical waveguides there is always a section where only the coating but not the entire jacket is present, and over that section the optical waveguide is apt to be bent sharply as it is threaded into the connector pin.

The present invention is directed to the problem of eliminating this risk of sharp bends in optical waveguides.

SUMMARY OF THE INVENTION

The present invention solves this problem by providing that the bore in the abutment comprise two sections with different diameters—the diameter of the first bore section, which terminates on the ceramic pin, corresponding to the diameter of the optical waveguide provided with a coating, and the second bore section having a diameter corresponding to the jacket of the optical waveguide.

Due to the two bore sections with different diameters, the optical waveguides are far less likely to be bent sharply during threading, which threading can therefore be performed without difficulty. Moreover, as a result of this provision the jacket becomes seated at the end of the larger-diameter bore section, and a seating of the coating in the other bore section is thus prevented. This is important as otherwise the optical waveguide might be subjected to shearing stresses resulting in a break.

BRIEF DESCRIPTION OF THE DRAWING

The single drawing shows a longitudinal section through a connector pin.

DETAILED DESCRIPTION

The connector pin 10 consists of a ceramic pin 11 with a central bore 12 of a diameter corresponding to that of a bare optical waveguide 7, i.e. an optical waveguide without coating and jacket. On its top surface, directed toward the interior of the connector pin, the ceramic pin is provided with a threading funnel 13. A metallic bushing 20 provided with a flange 21 is pressed onto the ceramic pin. The bushing 20 serves as a guide and the flange 21 of the bushing as a seat for a compression spring 25. A metallic abutment 14 forced onto the bushing forms an abutment for the compression spring 25, with a shoulder 15. Disposed between the shoulder 15 and the compression spring 25 is a thrust washer 26 that is firmly anchored in the connector shell 30.

Two bore sections 16 and 17 are formed in the abutment 14. The first bore section 16, which terminates on the ceramic pin 11, has a diameter corresponding to that of an optical waveguide with a coating 8 while the second bore section 17 is of a diameter matching that of an optical waveguide with a jacket 9. A lower threading funnel 18 is provided at the transition from the first bore section to the second, and an upper threading funnel 19 at the top of the second bore section 17.

In the manufacture of this device, the metallic bushing 20 is forced onto the ceramic pin 11 which has been set into a guide. Then adhesive is precisely metered into the threading funnel 13, the compression spring 25 with the thrust washer 26 is guided over the bushing 20, and the abutment 14 is forced into the bushing 20. Adhesive is then metered into the upper threading funnel 19, and this is followed by insertion of the optical waveguide 7, which over the stretch of the first bore section 16 still has its coating 8, and over that of the second bore section 17 also its jacket 9. Because it is tightly guided in the two sections, the optical waveguide is never in danger of being bent sharply.

What is claimed is:

1. A connector pin for an optical waveguide connector, which has a bushing with a flange pressed onto the connector pin, a compression spring supported on the busing at a first end and a thrust washer at a second end, and an abutment forced into the busing, said connector pin comprising:
    a) a ceramic solid having a first central bore accommodating a bare optical-waveguide;
    b) a second bore in the abutment accommodating a cylindrical optical waveguide with a surrounding coating and a jacket enveloping the optical waveguide and the surrounding coating, said second central bore including:
        (i) a first section having a diameter terminating on the connector pin and corresponding to a diameter of the optical waveguide with the surrounding coating; and
        (ii) a second section having a diameter corresponding to the jacket of the optical waveguide.

2. A connector for a cylindrical optical waveguide with a surrounding coating and a jacket enveloping the optical waveguide and the surrounding coating, said connector comprising:
    a) a ceramic connector pin having a central bore accommodating a bare optical waveguide;
    b) a busing and a flange pressed on to the ceramic connector pin;
    c) a thrust washer mounted on the abutment;

d) a compression spring having a first end supported on the busing and having a second end supported on the thrust washer; and e) an abutment forced into the bushing, and having a central bore accommodating the cylindrical optical waveguide, said central bore of the abutment including:

(i) a first section having a diameter terminating on the connector pin and corresponding to a diameter of the cylindrical optical waveguide with the surrounding coating; and (ii) a second section having a diameter corresponding to the jacket of the cylindrical optical waveguide.

* * * * *